June 20, 1933.  A. SHUMAN  1,915,255

APPARATUS FOR MAKING CORRUGATED WIRE GLASS

Filed June 16, 1932   2 Sheets-Sheet 2

WITNESS:

INVENTOR
Arno Shuman
BY
Augustus B. Stoughton
ATTORNEY.

Patented June 20, 1933

1,915,255

UNITED STATES PATENT OFFICE

ARNO SHUMAN, OF PHILADELPHIA, PENNSYLVANIA, ASSIGNOR TO PENNSYLVANIA WIRE GLASS COMPANY, OF PHILADELPHIA, PENNSYLVANIA, A CORPORATION OF NEW JERSEY

APPARATUS FOR MAKING CORRUGATED WIRE GLASS

Application filed June 16, 1932. Serial No. 617,538.

Objects of the present invention are to make corrugated wire glass sheets from continuously flowed glass; to provide an efficient machine for accomplishing that result; and to provide for making corrugated wire glass in the manner indicated and with either lengthwise or crosswise corrugations.

Generally stated, the apparatus includes a tank having a weir or dam over which glass flows, a pair of revoluble rolls which receive glass at their bite from the weir, means for introducing wire mesh through the glass at the bite of the rolls and through the rolls which roll it into a continuous sheet of wire glass, a corrugated sectional table consisting of a traveling endless belt, a revoluble corrugated roller cooperating with the table, and a chute for delivering the continuous sheet of wire glass from the rolls to the table, there being also usually present a press, a cutter and a lehr.

The invention also comprises the improvements to be presently described and finally claimed.

Figure 1:
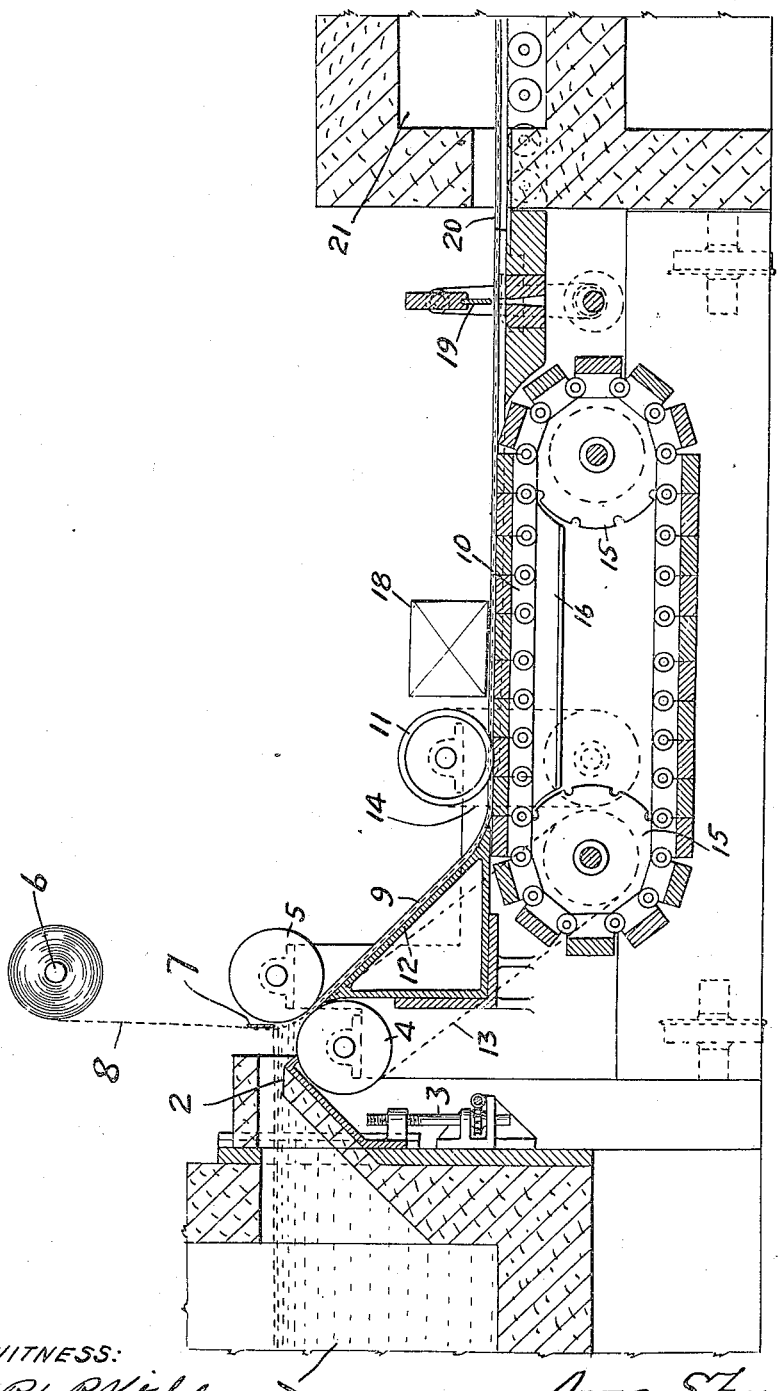

In the following description reference will be made to the accompanying drawings forming part hereof and in which Figure 1 is a longitudinal vertical section diagrammatically illustrating features of the invention.

Figure 2:
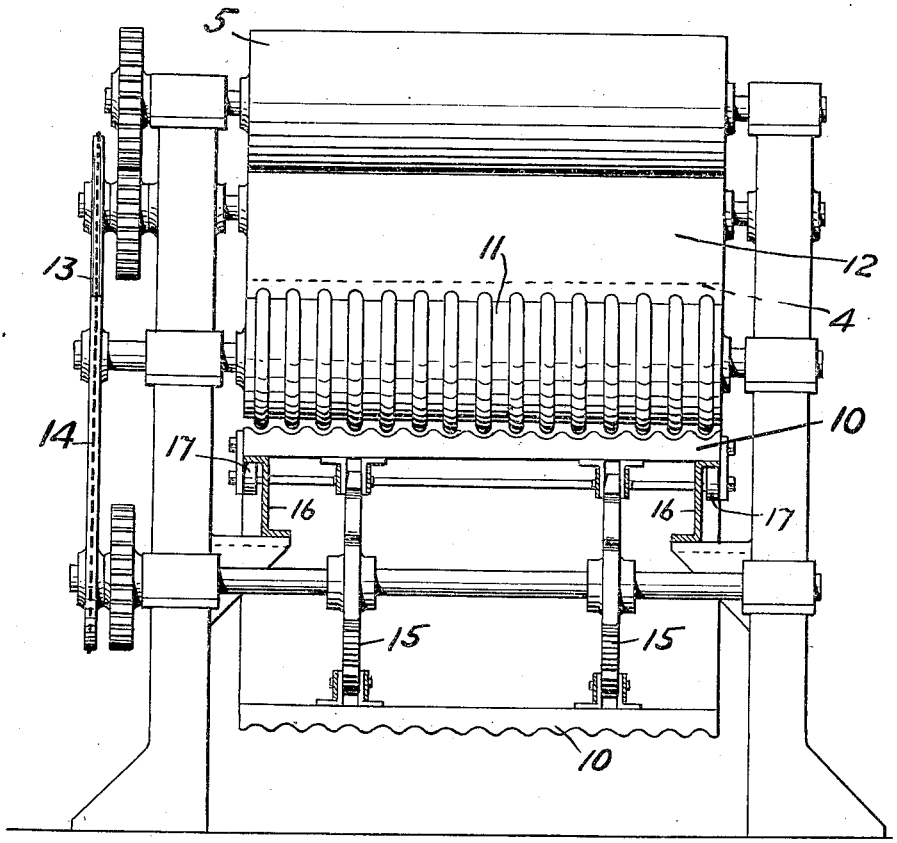
Figure 3:
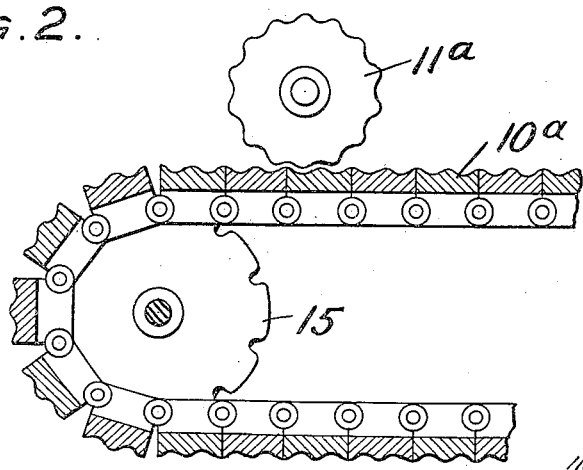

Fig. 2 is a transverse view, partly in section, of the apparatus shown in Fig. 1, and Fig. 3 is a partial sectional view illustrating a modification of the invention.

Referring to the drawings, 1 is a tank or receptacle for containing a supply of molten or melted glass. The tank 1 is provided with a dam or weir 2 over which glass flows. The level of the top of the dam or weir can be adjusted by means of a screw adjustment 3. 4 and 5 are a pair of revoluble rolls which receive glass at their bite from the dam or weir. 6 and 7 are means for introducing wire mesh 8 through the glass at the bite of the rolls 4 and 5, and through the rolls which roll it into a continuous sheet of wire glass 9. The element 7 is a bar capable of adjustment in order to properly center the wire mesh in the sheet of glass. There is a corrugated sectional table 10 consisting of a traveling endless belt. 11 is a revoluble corrugated roller cooperating with the table. 12 is a chute shown as water cooled for delivering the continuous sheet of wire glass from the rolls 4 and 5 to the table 10. 13 indicates a means for driving the rolls 4 and 5, and 14 indicates a means for driving the corrugated roller 11. The endless belt constituting the corrugated sectional table is driven by the notched wheels 15. The surface speed of the rolls 4 and 5 and of the table 10 and roller 11 is appropriate for accomplishing the work described and required of them. The sections of the table are pivotally connected and the table as a whole is shown as slidable on the rails 16, Fig. 2, in respect to which it is guided by wheels 17.

18 diagrammatically indicates a corrugated press which is a well known provision for finishing sheets of glass, wire or plain, after they have been corrugated by means of a roll. 19 is a cutter for cutting off sheets of corrugated wire glass 20, and it has an up and down movement. Both the press and the cutter are reciprocated horizontally so as to operate upon the moving sheet with which they travel for a short distance and then clear the sheet for a repetition of their intended functions. 21 is a lehr which receives the severed sheets and in which they are annealed.

The construction and mode of operation of the modification shown in Fig. 3 are as above described except that the roller 11ª and the sectional table 10ª are corrugated crosswise instead of lengthwise.

It will be obvious to those skilled in the art to which the invention relates that modifications may be made in details of construction and arrangement and matters of mere form without departing from the spirit of the invention which is not limited to such matters or otherwise than the prior art and the appended claim may require.

I claim:

In apparatus for making corrugated wire glass the combination of a tank having a weir over which glass flows, a pair of revoluble rolls which receive glass at their bite from the weir, means for introducing wire mesh through the glass at the bite of the rolls and through the rolls which roll it into a continuous sheet of wire glass, a corrugated sectional table consisting of a traveling endless belt, a revoluble corrugated roller cooperating with the table, and a chute for delivering the continuous sheet of wire glass from the rolls to the table.

ARNO SHUMAN.